United States Patent [19]

Batting et al.

[11] 4,280,626
[45] Jul. 28, 1981

[54] PRODUCT SEPARATION AND GRANULATION SYSTEM

[75] Inventors: Robert D. Batting, Barrington, R.I.; Donald G. Chabot, Sharon, Mass.; Donald R. Poland, East Greenwich, R.I.

[73] Assignee: Leesona Corporation, Warwick, R.I.

[21] Appl. No.: 82,065

[22] Filed: Oct. 5, 1979

[51] Int. Cl.³ ............................................. B07B 13/04
[52] U.S. Cl. ................................. 209/658; 209/941
[58] Field of Search ............... 209/656, 657, 658, 659, 209/660, 661, 906, 941, 925; 406/83, 88

[56] References Cited

U.S. PATENT DOCUMENTS

| | | | |
|---|---|---|---|
| 2,907,458 | 10/1959 | Scharein | 209/941 X |
| 2,969,875 | 1/1961 | McLeod | 209/941 X |
| 2,983,374 | 5/1961 | Engleson | 209/658 X |
| 3,029,941 | 4/1962 | Kular | 209/941 X |
| 3,761,134 | 9/1973 | Hurd | 406/83 |
| 3,870,628 | 3/1975 | De Noyer | 209/658 |

FOREIGN PATENT DOCUMENTS 2650948  5/1978  Fed. Rep. of Germany ........... 209/658

Primary Examiner—James L. Rowland
Attorney, Agent, or Firm—Robert J. Doherty

[57] ABSTRACT

A system for initially separating injection molded plastic parts from the sprue and runner assemblies formed therewith. The system is primarily intended for in situ use with an injection molding machine and includes a hopper-like structure having a supporting surface adapted to receive the plastic product from the molding machine and thereafter effect a separation thereof by means of the sequential operation of first and second barriers preferably within the time frame of a single cycle of the injection molding machine. The parts are delivered to a storage container while the sprue and runner assemblies are granulated.

7 Claims, 9 Drawing Figures

PRODUCT SEPARATION AND GRANULATION SYSTEM

BACKGROUND AND SUMMARY OF THE INVENTION

This invention relates to the handling of the products of a plastic injection molding machine and more particularly to a system whereby the useful parts thereof may be separated from the scrap components thereof and for subsequently effecting a granulation of such scrap components. It is advantageous to granulate such scrap material in the vicinity of the injection molding machine so as to reduce manual handling of the material including such procedures as the temporary storage of the scrap next to the machine and thereafter its transportation to a central granulation point. The molds utilized in injection molding machines include those generally referred to as two-part molds and those generally referred to as three-part molds. In three-part injection molds, the sprue and runner assemblies are automatically discharged at a location remote from that at which the parts are discharged while in two-part molds, the sprue and runner assemblies although separate from the parts, are intermixed therwith. Recent improvements in equipment adapted for the handling, i.e. granulation of scrap material, in conjunction with three-part injection molds has been proposed. The present invention is, however, directed to the handling, i.e. parts separation and subsequent granulation of plastic scrap produced in association with plastic injection molding machines utilizing the above-described two-part mold system.

Objects of the present invention include a system and its operational manner which can be effective to separate injection molded parts from the scrap (sprues and runners) simultaneously formed therewith and thereafter accomplish the granulation of such scrap in an efficient, a low cost manner which is adapted for in situ use in conjunction with an injection molding machine.

These and other objects of the present invention are accomplished by a system for the separation of the injection molded plastic products including parts and sprue and runner assemblies formed simultaneously therewith wherein said parts are separate from but intermixed with said sprue and runner assemblies, said parts having a relatively small height dimension and said sprue and runner assemblies having a relatively large web-like, generally co-planar base portion and exhibiting at least one relatively large height dimension which is disposed generally normal to said base portion, comprising a supporting surface for receiving the molded products of a single injection molding cycle including said parts and said sprue and runner assembly therefor, means for conveying said products along said supporting surface, a first barrier disposed in spaced relation above said surface and movable between a first position spaced from said supporting surface at a distance greater than the relatively small height dimension of said parts and less than the relatively large height dimension of said sprue and runner assembly such that said parts are permitted to pass beneath the first barrier to the downstream side thereof while retaining said sprue and runner assembly on the upstream side thereof and a second position disposed at a height above said supporting surface greater than the relatively large height dimension of said sprue and runner assembly such that said assemblies may pass therebeneath to the downstream side thereof, a second barrier disposed downstream of said first barrier and movable between a first position wherein said second barrier forms a portion of said supporting surface and a second position elevated therefrom whereby products conveyed along said supporting surface upstream thereof will be deflected downwardly thereof, granulation means operatively associated with said second barrier and having at least a portion thereof disposed therebeneath, a parts receiving means disposed at the downstream terminus of said supporting surface and positioned therebeneath, and means responsive to each molding cycle of said injection molding machine for initially sequentially maintaining said first and second barriers in the first positions thereof such that parts from said molding machine on said supporting surface upstream of said first barrier will be conveyed initially beneath said first barrier and thereafter over said second barrier to said parts receiving means and thereafter for shifting the position of said first and second barriers to their second alternate positions whereby the sprue and runner assembly of said parts initially located upstream of said first barrier will passs therebeneath and be diverted by said second barrier into said granulation means thereby affecting a sequential separation of said parts and sprue and runner assemblies including the temporary storage of said parts and the granulation of said assemblies.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
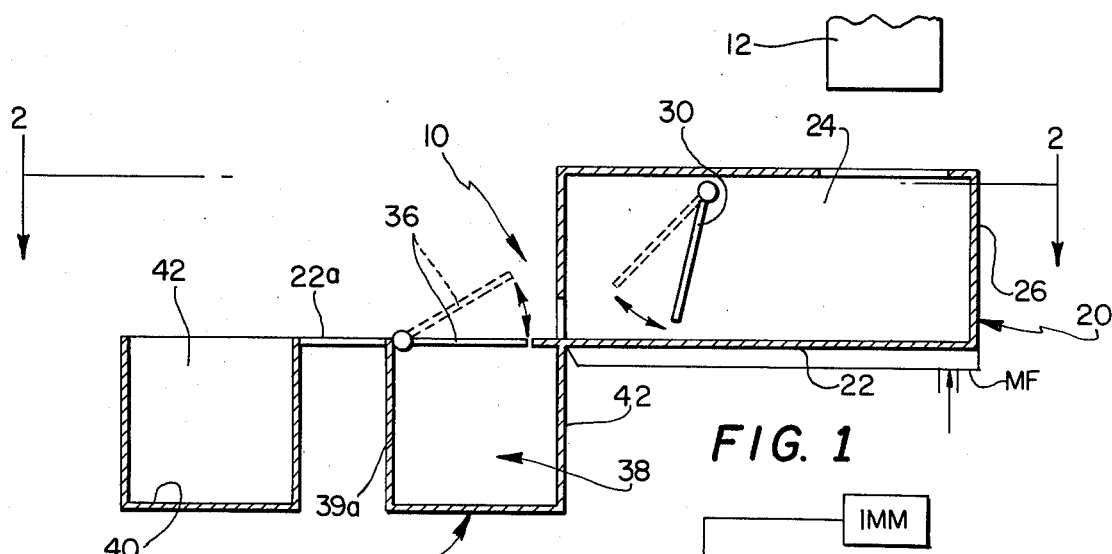
FIG. 1 is a somewhat schematic, side elevational view of the system of the present invention.
Figure 2:
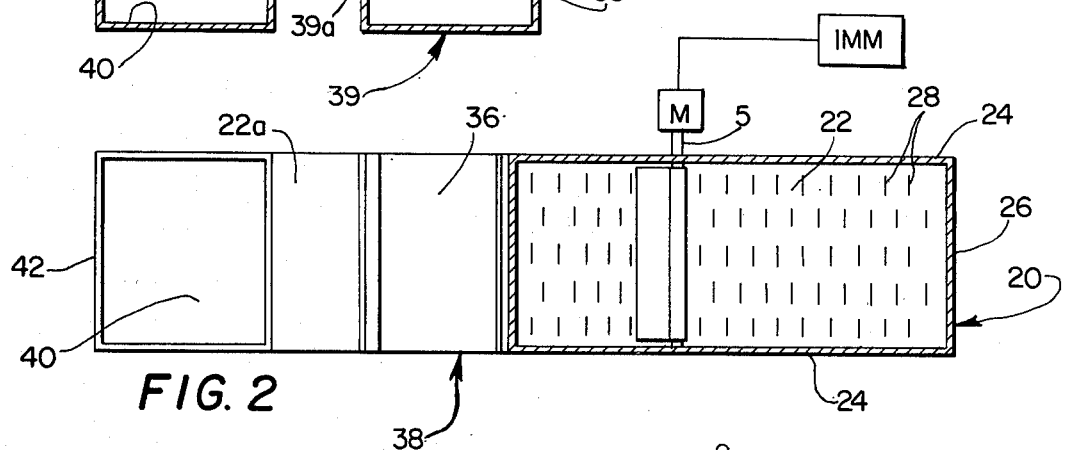
FIG. 2 is a top plan view thereof.

Referring to the drawings and particularly FIGS. 1 and 2 thereof, the product handling and granulation system 10 of the present invention is shown in an operational attitude positioned below the discharge area 12 of an injection molding machine IMM. Such injection molding machine may be of any standard type utilized for the injection molding of plastic parts through the use of a conventional two-part mold whereby the parts formed by such process along with the scrap components thereof (namely a sprue and runner assembly) are discharged separate from but intermixed with each other. The useful plastic parts formed from such injection molding machine may assume various configurations but normally include at least one surface on which they are adapted to rest on a generally planar supporting surface and accordingly exhibit a height or thickness upwardly extending therefrom. Also the sprue and runner assemblies produced by said aforementioned injection molding process normally includes a skeleton or web-like runner portion which normally defines a relatively large generally planar base and a normally centrally disposed somewhat thickened sprue upstanding therefrom. As best shown in FIGS. 4 through 7 such parts are identified by the reference numeral 14 whereas the sprue and runner assembly is identified by reference numeral 16 (the sprue portion further identified as 18 and the runner or base portion as 20).

The assembly 10 includes a hopper or bin 20 having a generally planar base 22, opposed spaced upstanding sidewalls 24 and an upstream end wall 26 disposed between said sidewalls 24. The bin 20 thus forms a container for the receipt of the intermixed parts and sprue and runner assemblies. Accordingly, the bin 20 is located beneath the drop out area 12 of the injection molding machine such that the molded products may fall by gravity therein.

In order to convey the parts and assemblies 14, 16 respectively longitudinally with respect to the bin 20, the base 22 thereof is provided with a plurality of separate slits or openings 28 such that pressurized air from a source (not shown) may be directed by means such as a manifold MF angularly upwardly through the slits 28 so as to impart a downstream force thereto, that is, in a direction to the left as viewed in the drawings. Such air flow includes both elevating and downstream flow components. Any conventional air jet conveyor system may be utilized to effect such downstream motion to the parts and sprue and runner assemblies such as that shown in U.S. Pat. No. 3,180,688 issued Apr. 27, 1965, the disclosure of which is hereby specifically incorporated by reference. In addition, while air jet conveying is the preferred form of moving the molded products, other product conveying means may be utilized in conjunction with the system of the present invention.

The bin 20 further includes a first deflector or product barrier in the form of a generally planar member of 30 of flap-like configuration and supported for pivotal movement between first and second alternate positions by suitable attachment to the sidewalls 24. The lower terminal end 32 of the member 30 in the aforementioned lower most or first alternate position of such member 30 is upwardly spaced from the supporting surface a distance greater than the relatively small height dimension of the parts 14 but lower than the relatively large height dimension of the assembly 16. Suitable known means such as a motor M and connecting shaft S for pivoting such member 30 are provided such that the member may pivot from such first position to an alternate second position as shown by the dotted line representation in FIG. 1 at which point the lower terminal surface 32 thereof is disposed at a height above that of the relatively large height dimension of the sprue and runner assembly 16. Also and especially in those cases where the conveying means is by air jet stream, the member 30 preferably is disposed in an acute angular relationship with the upstream portion of the supporting surface 22 such that portions of such air flow which may tend to move out of a general horizontal air flow pattern will be downwardly deflected back on to the supporting surface 22 and thus will not tend to undesirably elevate the parts or assemblies out of supporting contact from such surface 22 as they are conveyed downstream with respect to the bin 20. In addition, such member 30 is provided with a plurality of openings 34 through which the air stream may pass so as to eliminate undue fluid turbulence where the air impinges upon the upstream surface of the member 30.

The bin 20 is open at the downstream side thereof and adjacent thereto and continuing therefrom is a product supporting surface extension 22a. Part of the extension 22a includes the upper surface of a second product deflector or barrier 36 which is adapted to move between a first or lower most position in which such surface 36 forms a portion of the supporting surface extension 22a and to an elevated second position in which such barrier 36 acts to deflect product to a position therebeneath. Disposed beneath such second barrier 36 and in operational association therewith, is at least a portion of a granulation means 38 (schematically shown). In this regard, such granulation means 38 preferably includes a low profile granulator (not shown) disposed within the confines of a container 39 formed by confining wall and including an end wall 39a to which the second barrier 36 may be hinged attached for pivotal movement as schematically illustrated in FIG. 1.

Figure 6:
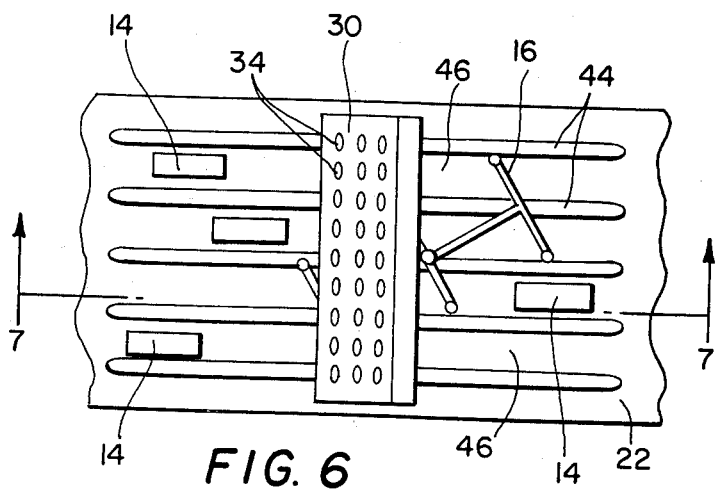
FIG. 6 is a view similar to FIG. 4 but showing a further constructional embodiment of the present invention.
Figure 7:
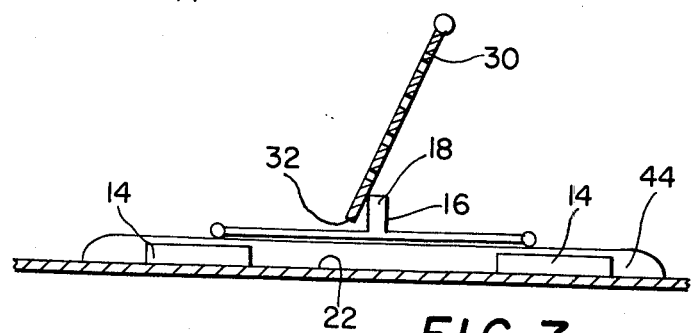
FIG. 7 is a side-elevational view taken along the line 7—7 of FIG. 6.
Figure 8:
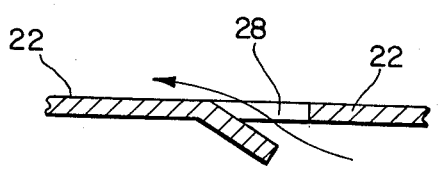
FIG. 8 is an enlarged sectional view taken through a portion of the conveying surface showing the manner in which a pressurized flow of air may be used to pneumatically convey the injection molded products along the supporting surface.

Turning now to FIGS. 6 and 7, a modified form of the invention is shown. Therein, the supporting surface 22 of the bin 30 is additionally provided with a plurality of laterally spaced, longitudinally oriented upstanding ribs 44. Such placement of the ribs forms channels 46 therebetween. The ribs 44 are of a height about that of the relatively small height dimension of the parts 14 and below that of the terminus 32 of member 30 on its lower or first position. In this way, the parts 14 tend to fall into the channels 46 and move beneath the first barrier without interference from the assembly 16. Also the assembly is held above the surface 22 by bridging two or more of the ribs.

Downstream of the granulation means 38, a parts receiving bin 40 or other means for the temporary storage of parts is disposed. Such may take the form of any appropriate enclosure and is generally provided with an open top 42 adjacent the downstream terminus of the parts supporting surface extension 22a such that parts moving along the extension may fall by gravity into the parts receiving container 40. Similarly, sprue and runner assemblies 16 deflected downwardly beneath the second barrier 36 will fall by gravity into the granulation means 38.

Figure 3A:
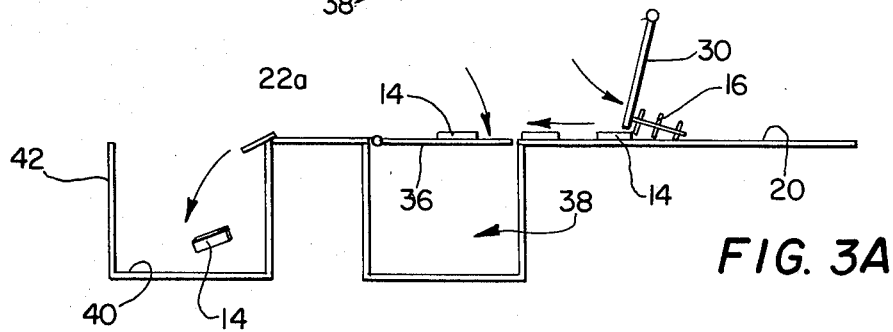
FIG. 3A is a schematic view showing the manner in which the system of the present invention may be utilized to effect a separation between the parts and sprue and runner assemblies produced by injection molding machines and for the temporary storage of such parts.
Figure 3B:
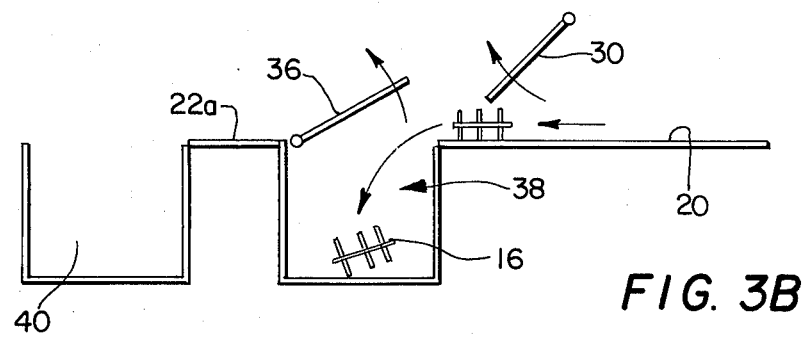
FIG. 3B is a view similar to FIG. 3A but showing the manner in which the system may be utilized to subsequently convey sprue and runner assemblies to a granulation means.
Figure 4:
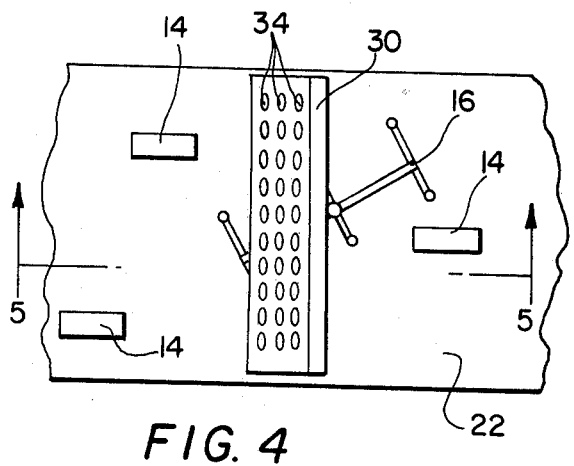
FIG. 4 is a plan view of a portion of the receiving means of the present invention showing one constructional embodiment of the first barrier portion thereof.
Figure 5:
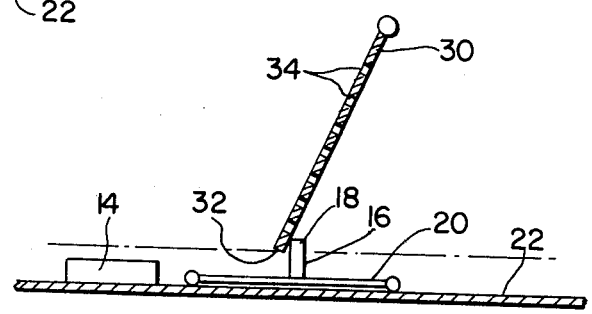
FIG. 5 is a side-sectional view taken along the line 5—5 of FIG. 4.

The operation of the system 10 so as to effect sequential separation of the parts 14 from their sprue and runner assembly 16, the temporary storage of such parts in the parts receiving container 40 and the granulation of the sprue and runner assembly will now be explained by particular reference to FIGS. 3a, 3b and 4 and 5. In FIG. 3a, the first barrier 30 is disposed in its lower or first position such that the parts 14 may pass thereunder but the sprue and runner assembly 16 is caught thereby, that is, the upwardly projecting sprue portion 18 thereof engages the upstream side of the member 30 assuming that the normal disposition of the assembly 16 takes place with the generally planar web portion 20 thereof contacting the product engaging surface 22. Thereafter with the second barrier 36 in its first or closed position and forming a portion of the extension 22a, the parts 14 will pass over the granulation means 38 and into the parts receiving bin 40 wherein they may be thereafter handled in the desired manner. After the parts have been received in the container 40, the first and second barriers 30 and 36 respectively are then moved to their alternate second positions such that the sprue and runner assembly 16 is released by the first barrier 30, passes downstream along the bin and subsequently is defected by the second barrier 36 downwardly by gravity into the granulation means 38. Granulation of the scrap portion of the product is thus effected by the granulator which operates either continuously or intermittantly.

The movement of the first and second barriers to their alternate second positions may be effected either simultaneously or the second barrier 36 is raised to its upper position initially and thereafter the similar pivotal movement of the first barrier 30 carrier out. Normally the aforementioned separation and temporary parts storage and granulation sequences take place within the time frame of one complete cycling of the injection molding machine such that only the plastic products of a single injection molding cycle are handled at any one time by system 10. In accordance therewith, the aforementioned sequential operations of the device may be timed so as to take a proportional part of the injection molding time cycle. In general practice, it is also desirable that such operational sequences of the sytem 10 take place in a time frame somewhat less than the cycling time of the injection molding machine which it is coupled so as to provide a margin of safety and so as to insure that injected molded products from a subsequent cycle do not fall into the bin 20 before the previously formed products may be handled in the aforementioned intended manner. In addition to timing mechanisms, the afore-mentioned sequence of the present system may be carried out in part by various known signal devices including photoelectric means, weight and mechanical switching mechanisms, such that the barriers move to their alternate position at the desired time.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A system for the separation of injection molded plastic products including parts and sprue and runner assemblies formed simultaneously therewith wherein said parts are separate from but intermixed with said sprue and runner assemblies, said parts having a relatively small height dimension and said sprue and runner assemblies having a relatively large web-like co-planar base portion and exhibiting at least one relatively large height dimension which is disposed generally normal to said base portion, comprising a supporting surface for receiving the molded products of a single injection molding cycle including said parts and said sprue and runner assembly therefor, means for conveying said products along said supporting surface, a first barrier disposed in spaced relation above said surface and movable between a first position spaced from said supporting surface at a distance greater than the relatively small height dimension of said parts and less than the relatively large height dimension of said sprue and runner assembly such that said parts are permitted to pass beneath the first barrier to the downstream side thereof while retaining said sprue and runner assembly on the upstream side thereof and a second position disposed at a height above said supporting surface greater than the relatively large height dimension of said sprue and runner assembly such that said assemblies may pass therebeneath to the downstream side thereof, a second barrier disposed downstream of said first barrier and movable between a first position wherein said second barrier forms a portion of said supporting surface and a second position elevated therefrom whereby products conveyed along said supporting surface upstream thereof will be deflected downwardly thereof, granulation means operatively associated with said second barrier and having at least a portion thereof disposed therebeneath, a parts receiving means disposed at the downstream terminus of said supporting surface and positioned therebeneath, and means responsive to each molding cycle of said injection molding machine for initially sequentially maintaining said first and second barriers in the first positions thereof such that parts from said molding machine on said supporting surface upstream of said first barrier will be conveyed initially beneath said first barrier and thereafter over said second barrier to said parts receiving means and thereafter for shifting the position of said first and second barrers to their second alternate positions whereby the sprue and runner assembly of said parts initially located upstream of said first barrier will pass therebeneath and be diverted by said second barrier into said granulation means thereby affecting a sequential separation of said parts and sprue and runner assemblies including the temporary storage of said parts and the granulation of said assemblies.

2. The system set forth in claim 1 wherein said first barrier comprises a substantially planar member supported at an upper portion thereof for pivotal movement between said first and second positions thereof.

3. A system for the separation of injection molded plastic products including parts and sprue and runner assemblies formed simultaneously therewith wherein said parts are separate from but intermixed with said sprue and runner assemblies, said parts having a relatively small height dimension and said sprue and runner assemblies having a relatively large web-like co-planar base portion and exhibiting at least one relatively large height dimension which is disposed generally normal to said base portion, comprising a supporting surface for receiving the molded products of a single injection molding cycle including said parts and said sprue and runner assembly therefor, means for conveying said products along said supporting surface, a first barrier disposed in spaced relation above said surface and movable between a first position spaced from said supporting surface at a distance greater than the relatively small height dimension of said parts and less than the relatively large height dimension of said sprue and runner assembly such that said parts are permitted to pass beneath the first barrier to the downstream side thereof while retaining said sprue and runner assembly on the upstream side thereof and a second position disposed at a height above said supporting surface greater than the relatively large height dimension of said sprue and runner assembly such that said assemblies may pass therebeneath to the downstream side thereof, a second barrier disposed downstream of said first barrier and movable between a first position wherein said second barrier forms a portion of said supporting surface and a second position elevated therefrom whereby products conveyed along said supporting surface upstream thereof will be deflected downwardly thereof, granulation means operativey associated with said second barrier and having at least a portion thereof disposed therebeneath, a parts receiving means disposed at the downstream terminus of said supporting surface and positioned therebeneath, and means responsive to each molding cycle of said injection molding machine for initially sequentially maintaining said first and second barriers in the first positions thereof such that parts from said molding machine on said supporting surface upstream of said first barrier will be conveyed initially beneath said first barrier and thereafter over said second barrier to said parts receiving means and thereafter for shifting the position of said first and second barriers to their second alternate positions whereby the sprue and runner assembly of said parts initially located upstream of said first barrier will pass therebeneath and be diverted by said second barrier into said granulation means thereby affecting a sequential separation of said parts and sprue and runner assemblies including the temporary storage of said parts and the granulation of said assemblies, wherein said supporting surface includes a plurality of perforations and said conveying means include means for directing pressurized air through said perforations so as to pneumatically convey said products along said supporting surface, said first barrier including a plurality of air openings disposed therethrough such that conveying air may pass therethrough.

4. The system set forth in claim 3 wherein said first barrier comprises a substantially planar member disposed at an acute angle with respect to the upstream side of said supporting surface such that the air moving downstream thereof will at least partially deflected back on to the supporting surface in said first alternate position thereof.

5. The system as set forth in claim 2 wherein a portion of said supporting surface is partially enclosed by a product receiving bin having sidewalls upstanding from said supporting surface and defining an upper opening disposed upstream of said first barrier for receipt of said product and an end opening downstream of said first barrier and upstream of said second barrier, said member supported between an opposed pair of said upstanding sidewalls.

6. A system for the separation of injection molded plastic products including parts and sprue and runner assemblies formed simultaneously therewith wherein said parts are separate from but intermixed with said sprue and runner assemblies, said parts having a relatively small height dimension and said sprue and runner assemblies having a relatively large web-like co-planar base portion and exhibiting at least one relatively large height dimension which is disposed generally normal to said base portion, comprising a supporting surface for receiving the molded products of a single injection molding cycle including said parts and said sprue and runner assembly therefor, means for conveying said products along said supporting surface, a first barrier disposed in spaced relation above said surface and movable between a first position spaced from said supporting surface at a distance greater than the relatively small height dimension of said parts and less than the relativey large height dimension of said sprue and runner assembly such that said parts are permitted to pass beneath the first barrier to the downstream side thereof while retaining said sprue and runner assembly on the upstream side thereof and a second position disposed at a height above said supporting surface greater than the relatively large height dimension of said sprue and runner assembly such that said assemblies may pass therebeneath to the downstream side thereof, a second barrier disposed downstream of said first barrier and movable between a first position wherein said second barrier forms a portion of said supporting surface and a second position elevated therefrom whereby products conveyed along said supporting surface upstream thereof will be deflected downwardly thereof, granulation means operatively associated with said second barrier and having at least a portion thereof disposed therebeneath, a parts receiving means disposed at the downstream terminus of said supporting surface and positioned therebeneath, and means responsive to each molding cycle of said injection molding machine for initially sequentially maintaining said first and second barriers in the first positions thereof such that parts from said molding machine on said supporting surface upstream of said first barrier will be conveyed initially beneath said first barrier and thereafter over said second barrier to said parts receiving means and thereafter for shifting the position of said first and second barriers to their second alternate positions whereby the sprue and runner assembly of said parts initially located upstream of said first barrier will pass therebeneath and be diverted by said second barrier into said granulation means thereby affecting a sequential separation of said parts and sprue and runner assemblies including the temporary storage of said parts and the granulation of said assemblies, wherein said supporting surface is provided with a plurality of upstanding laterally spaced ribs for supporting the generally skelton web portions of said sprue and runner assemblies on the top surfaces thereof thereby enhancing the movement of parts beneath said first barrier in its first partially closed position.

7. The system as set forth in claim 6 wherein the height of said webs approximately that of the relatively small height dimension of said parts.

* * * * *